United States Patent
Honda et al.

(10) Patent No.: US 8,064,844 B2
(45) Date of Patent: Nov. 22, 2011

(54) WIRELESS COMMUNICATION APPARATUS, POWER AMPLIFIER CONTROL METHOD, AND POWER AMPLIFIER CONTROL APPARATUS

(75) Inventors: Atsushi Honda, Kawasaki (JP); Kaoru Yokoo, Kawasaki (JP); Yasuyuki Oishi, Kawasaki (JP); Yoji Ohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 571 days.

(21) Appl. No.: 12/324,914

(22) Filed: Nov. 28, 2008

(65) Prior Publication Data

US 2009/0137218 A1    May 28, 2009

(30) Foreign Application Priority Data

Nov. 28, 2007    (JP) .................................. 2007-308095

(51) Int. Cl.
*H04B 1/44* (2006.01)
*H03G 3/00* (2006.01)
(52) U.S. Cl. .......... 455/78; 455/83; 455/127.1; 330/127
(58) Field of Classification Search .................... 455/78, 455/83, 127.1, 127.2, 127.3, 127.5, 343.1, 455/574; 330/127, 250
See application file for complete search history.

(56) References Cited

U.S. PATENT DOCUMENTS

| | | | | |
|---|---|---|---|---|
| 6,366,764 B1 * | 4/2002 | Yang et al. | ...................... | 455/78 |
| 6,418,304 B1 * | 7/2002 | Morrar | ........................ | 455/343.1 |
| 7,715,810 B2 * | 5/2010 | Brobston | ................... | 455/127.1 |
| 7,991,367 B2 * | 8/2011 | Pratt et al. | ................... | 455/127.1 |
| 2007/0182483 A1 * | 8/2007 | Seyfried et al. | ............... | 330/127 |

FOREIGN PATENT DOCUMENTS

| JP | H04-373317 | 12/1992 |
|---|---|---|
| JP | H09-074321 | 3/1997 |

* cited by examiner

*Primary Examiner* — Howard Williams
(74) *Attorney, Agent, or Firm* — Fujitsu Patent Center

(57) ABSTRACT

In a wireless communication apparatus in a time division duplex system, a transmission signal generation unit generates a transmission signal. A power amplifying device amplifies the generated transmission signal. A control signal generation device generates a drain voltage control signal for control of the drain voltage of the power amplifying device, and a gate voltage control signal for control of the gate voltage of the power amplifying device. The switch unit switches off the drain power supply of the power amplifying device during reception in the time division duplex system according to the drain voltage control signal. In addition, the power amplifying device sets a higher gate voltage during reception in the time division duplex system higher than during transmission according to the gate voltage control signal.

6 Claims, 8 Drawing Sheets

WIRELESS COMMUNICATION APPARATUS, POWER AMPLIFIER CONTROL METHOD, AND POWER AMPLIFIER CONTROL APPARATUS

BACKGROUND OF THE INVENTION

1. Field of the Invention

The present invention relates to the technology of controlling a power amplifier, and more specifically to a power amplifier used in a wireless transmission/reception device in a time division duplex system.

2. Description of the Related Art

In the time division duplex system (hereinafter referred to as TDD for short), a communication path is divided by a time axis, a transmission/reception switch is quickly made, and a frequency band is shared between a transmitter and a receiver. As shown in FIGS. 1A and 1B, a switch and a circulator are provided immediately below an antenna so that communications can be performed by switching between transmission and reception.

In the TDD system, a frequency band is shared between transmission and reception. Therefore, it is necessary that isolation is completely secured between a transmission unit and a reception unit. When the isolation is not sufficient, there occur problems such as a leak of a transmission signal to the reception unit, saturating a low noise amplifier, etc. For example, when a transmission/reception changeover switch is provided, the transmission/reception switch time is shorter at a higher transmission rate. Then, with a shorter transmission/reception switch time, it becomes more difficult to secure the isolation.

To secure the isolation, it is desired that the power amplifier of the transmission unit is turned on and the low noise amplifier of the reception unit is turned off during transmission, and that the power amplifier of the transmission unit is turned off and the low noise amplifier of the reception unit is turned on during reception. It is necessary from the viewpoint of improving power efficiency.

Assume a power amplifier using a field effect transistor. In this case, since a power current passing through a drain is large in the power amplifier, the current value is not immediately set to zero due to transient response although the voltage to be applied to the drain is switched off. Therefore, the residual signal is leaked to the reception side, thereby possible degrading the reception performance.

As the technology for controlling the on/off state of the power amplifier to solve the above-mentioned problems, for example, Japanese Published Patent Application No. H9-74321 discloses the technology of providing an emitter unit of a high frequency amplification transistor with a switching element together with an emitter resistor and setting an active state during reception and passive state during transmission, thereby turning on/off a high frequency amplification transistor.

As another technique for controlling the on/off state of the power amplifier, for example, Japanese Published Patent Application No. H4-373317 discloses the technology of providing a transmitting power amplifier and a receiving power amplifier to turn off the transmitting power amplifier by the control voltage during reception and turn on the receiving power amplifier. Then, the receiving power amplifier is turned off and the transmitting power amplifier is turned on by the control voltage during transmission.

The methods disclosed by the above-mentioned Japanese Published Patent Application No. H9-74321 and Japanese Published Patent Application No. H4-373317 switch on and off the transmitting power amplifier to suppress a leak of the transmission signal to the reception unit in the TDD system. However, as described above, since the current passing through the drain of the power amplifier is large, it is not easy to quickly switch on/off the power amplifier by the switch circuit.

SUMMARY OF THE INVENTION

The present invention aims at realizing control of quickly switching on/off the power amplifier in a simple method on the wireless transmission/reception device in the time division duplex system to effectively suppress a leak of a current from a transmission unit to a reception unit, thereby preventing interference by the leak of the current and improving the power efficiency.

To solve the above-mentioned problem, a wireless communication apparatus by a time division duplex system includes an antenna, a transmission unit generating a transmission signal to be transmitted through the antenna, a reception unit demodulating the signal received through the antenna, and a transmission/reception switch unit connecting the transmission unit to the antenna during reception and connecting the reception unit to the antenna during reception. With the configuration, the transmission unit includes: a transmission signal generation unit generating the transmission signal; a power amplifying unit amplifying the transmission signal generated by the transmission signal generation unit; a control signal generation unit generating a drain voltage control signal for control of a drain voltage of the power amplifying unit and a gate voltage control signal for control of a gate voltage of the power amplifying unit; and a switch unit switching off a drain power supply of the power amplifying unit during reception in a time division duplex system. The power amplifying unit sets a higher gate voltage during reception in the time division duplex system than during transmission.

The wireless communication apparatus switches off the drain power supply of the transmitting power amplifier (power amplifier) during reception in the time division duplex system, and sets a higher gate voltage value than during transmission. By setting a higher gate voltage value during reception than during transmission, the power amplifying device can be switched off more correctly during reception, a leak of a current from the transmission unit to the reception unit can be prevented, and the power amplifying device can be quickly switched on/off.

Otherwise, a wireless communication apparatus by a time division duplex system includes an antenna, a transmission unit generating a transmission signal to be transmitted through the antenna, a reception unit demodulating the signal received through the antenna, and a transmission/reception switch unit connecting the transmission unit to the antenna during reception and connecting the reception unit to the antenna during reception. With the configuration, the transmission unit includes: a transmission signal generation unit generating the transmission signal; a multi-stage power amplifying unit amplifying the transmission signal generated by the transmission signal generation unit; a control signal generation unit generating a drain voltage control signal for control of a drain voltage for each power amplifying unit; and a switch unit switching off a drain power supply of the power amplifying unit during reception in a time division duplex system for at least a power amplifying unit provided at a closest position from the antenna in the multi-stage power amplifying unit. The power amplifying unit whose drain power supply is switched off during reception in the time division duplex system is switched on when a drain power supply of a power amplifying unit farthest from the antenna is switched from reception to transmission in the time division duplex system by sequentially switching on the drain power supply from a power amplifying unit closer to the antenna.

The wireless communication apparatus prevents a leak from the transmission unit to the reception unit by switching off the drain power supply of at least the power amplifying unit closest to the antenna in the multi-stage power amplifying unit during reception in the time division duplex system. Furthermore, when the drain power supply switched off during reception is switched on, the switch on is performed sequentially from the power amplifying unit farthest from the antenna, and the timing of switching on the drain power supply of the power amplifying unit closest to the antenna is made to match the timing of switching from reception to transmission. While matching the rising timing for each power amplifying unit by changing the timing of switching on depending on the capacity of each power amplifying device, the power amplifying unit closest to the antenna is switched on with the timing of the transmission/reception switch, whereby preventing a leak of current from the transmission unit to the reception unit, and realizing the quick on/off switch of power amplifying devices.

The control signal generation unit can further generate a gate voltage control signal for control of a gate voltage of the power amplifying unit, and the power amplifying unit can set a higher gate voltage during reception in the time division duplex system than during transmission. By setting a higher gate voltage value during reception than during transmission, the power amplifying device can be more correctly switched off, thereby quickly switching on/off the power amplifying device.

The disclosed wireless communication apparatus can quickly switch on and off the power amplifying device, and a leak of current from the transmission unit to the reception unit can be effectively suppressed. By suppressing the leak of current to the reception unit, the interference by the leak of current can be prevented, and the power efficiency can be improved.

DESCRIPTION OF THE PREFERRED EMBODIMENTS

The preferred embodiments of the present invention are described below in detail with reference to the attached drawings.

Figure 1A:
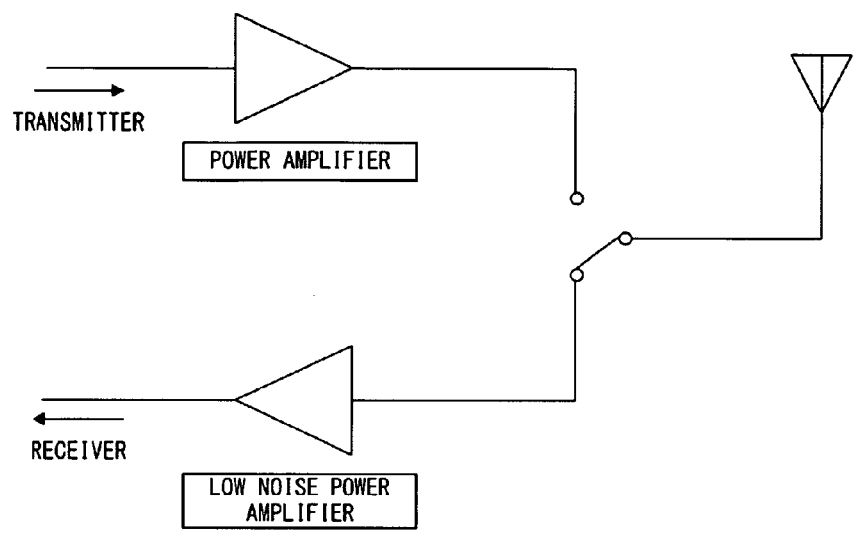
FIG. 1A is an explanatory view (1) of a method of switching between transmission and reception in the conventional time division duplex system.
Figure 1B:
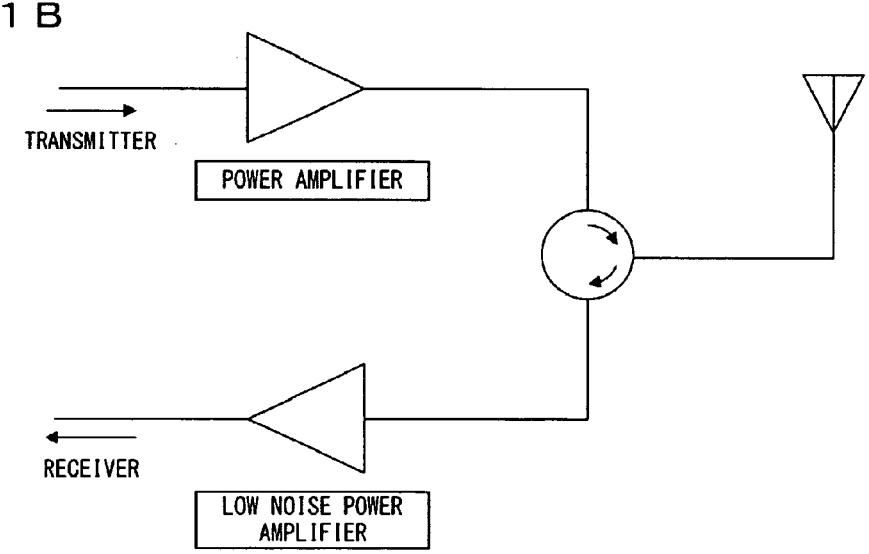
FIG. 1B is an explanatory view (2) of a method of switching between transmission and reception in the conventional time division duplex system.
Figure 2:
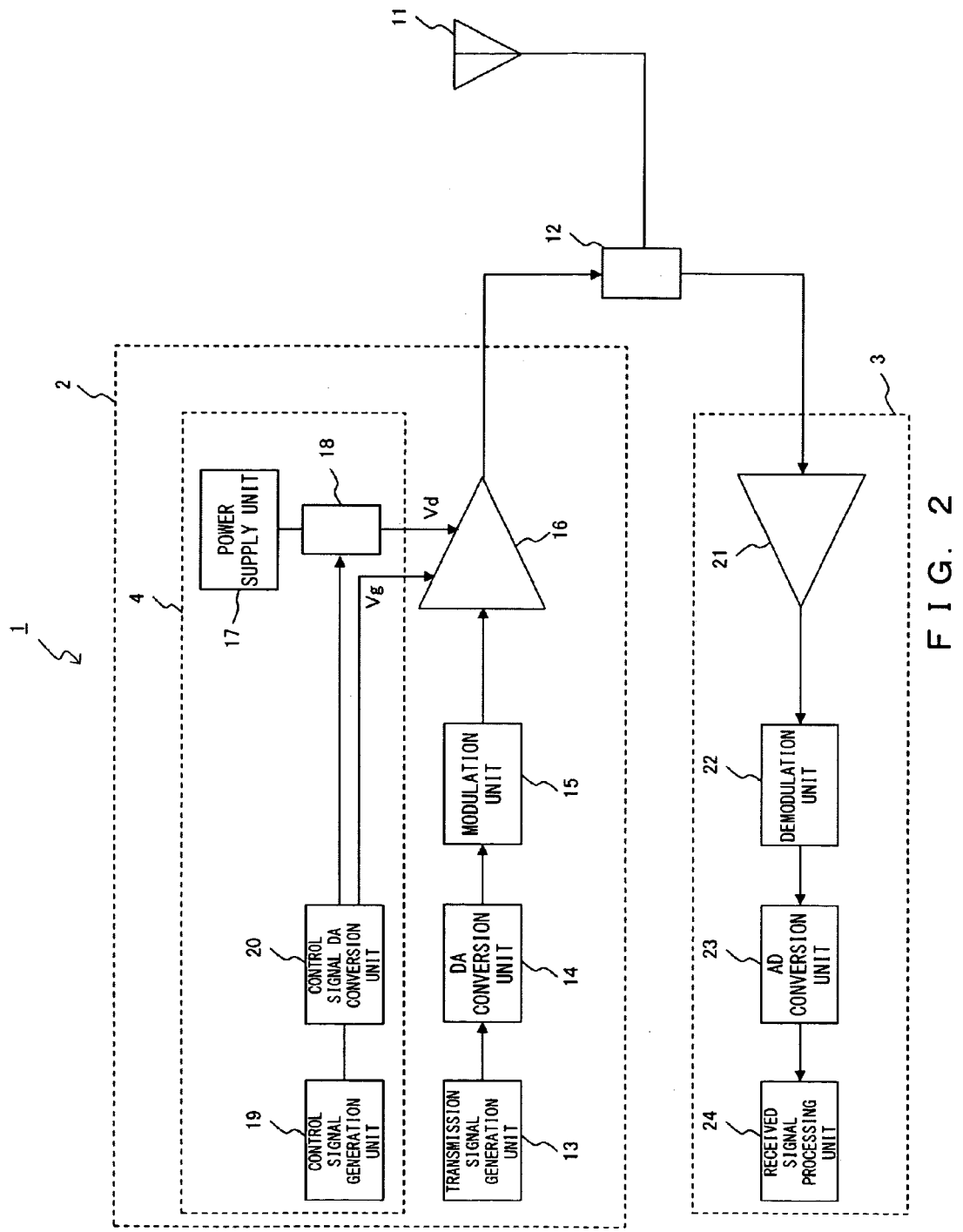
FIG. 2 shows the configuration of the wireless transmitter/receiver according to the first embodiment.

FIG. 2 shows the configuration of the wireless transmitter/receiver according to the first embodiment. A wireless transmitter/receiver 1 shown in FIG. 2 is provided for a terminal device in the TDD system, and is configured by an antenna 11, a transmission/reception switch unit 12, a transmission unit 2, and a reception unit 3.

The transmission unit 2 is configured by a transmission signal generation unit 13, a DA conversion unit 14, a modulation unit 15, a power amplifier 16, and a power amplifier control unit 4.

In the configuration of the transmission unit 2, the antenna 11 transmits a signal from the wireless transmitter/receiver 1 and is addressed to a base station or a terminal device of a communication partner, and receives a signal transmitted from the base station or the terminal device of the communication partner.

The transmission/reception switch unit 12 switches the connection object of the antenna 11 to the transmission unit 2 and the reception unit 3. Practically, the switch unit 12 can be a transmission/reception switch unit or a circulator.

The transmission signal generation unit 13 generates an up transmission signal to be transmitted from a terminal device. The DA conversion unit 14 converts a transmission signal generated by the transmission signal generation unit 13 into an analog signal. The modulation unit 15 performs a modulating process according to the input signal from the DA conversion unit 14, and generates a modulated wave. The power amplifier 16 is configured by a power amplifier using a field effect transistor, and amplifies the modulated wave generated by the modulation unit 15. The amplified modulated wave is transmitted through the antenna 11.

The power amplifier control unit 4 is configured by a power supply unit 17, a switch unit 18, a control signal generation unit 19, and a control signal DA conversion unit 20, and controls the power amplifier 16 of the transmission unit 2.

The power supply unit 17 provides electric power for the drain power supply of the power amplifier 16. The switch unit 18 switches on/off the power which the power supply unit 17 provides for the power amplifier 16. The control signal generation unit 19 generates a control signal for control of the power amplifier 16. The control signal DA conversion unit 20 converts the input signal from the control signal generation unit 19 into an analog signal, and provides the signal for the switch unit 18 and the power amplifier 16.

The reception unit 3 is configured by a low noise amplifier 21, a demodulation unit 22, an AD conversion unit 23, and a received signal processing unit 24.

The low noise amplifier 21 amplifies a signal received through the antenna 11. The demodulation unit 22 performs a demodulating process on the process amplified by the low noise amplifier 21, and retrieves an information signal from the modulated wave. The AD conversion unit 23 converts the information signal retrieved by the demodulation unit 22 into a digital signal. The received signal processing unit 24 retrieves desired data from the digital signal input by the AD conversion unit 23, and provides the data for an upper control circuit etc. as not shown in FIG. 2.

The power amplifier control unit 4 generates a control signal in synchronization with the transmission signal generating process by the transmission signal generation unit 13, and controls a drain voltage value Vd and a gate voltage value Vg of the power amplifier 16 in accordance with the transmission/reception time chart. Next, with reference to FIG. 3, a practical method of the power amplifier control unit 4 controlling the power amplifier 16 is described below.

Figure 3:
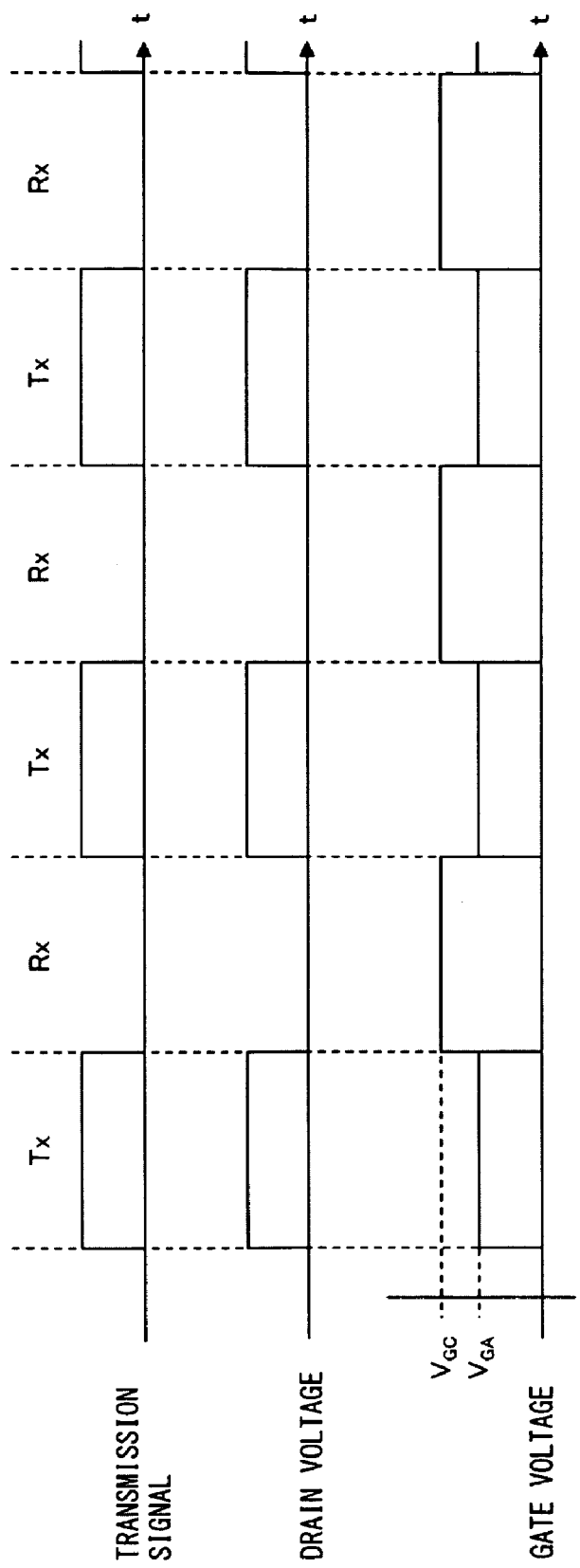
FIG. 3 shows the transmission/reception time chart and the relationship between the drain voltage and the gate voltage of the power amplifier.

FIG. 3 shows the transmission/reception time chart and the relationship between the drain voltage and the gate voltage of the power amplifier 16. A time axis is set on the right of FIG. 3. In FIG. 3, "Tx" is transmission time, and "Rx" is reception time.

In the transmission time, that is, in a period in which a transmission signal is output, the drain power supply is turned on. Then, the drain voltage value Vd included in the control signal is set. At this time, the gate voltage value Vg is set to $V_{GA}$. In the period in which there is no transmission signal output in the reception time, the value of the drain voltage is set to 0 to switch off the 16, and the gate voltage value Vg is set to a value $V_{GC}$ higher than the gate voltage value $V_{GA}$.

The gate voltage value $V_{GA}$ at the transmission time Tx is a gate voltage value at which the power amplifier 16 performs an A class operation, and the gate voltage value $V_{GC}$ is a value at which the power amplifier 16 performs a C class operation.

FIGS. 4, 5, 6A, and 6B are explanatory views of the operation of the power amplifier 16 when a gate bias is controlled. With reference to the drawings, the operations of the power amplifier 16 in the bias system are described.

Figure 4:
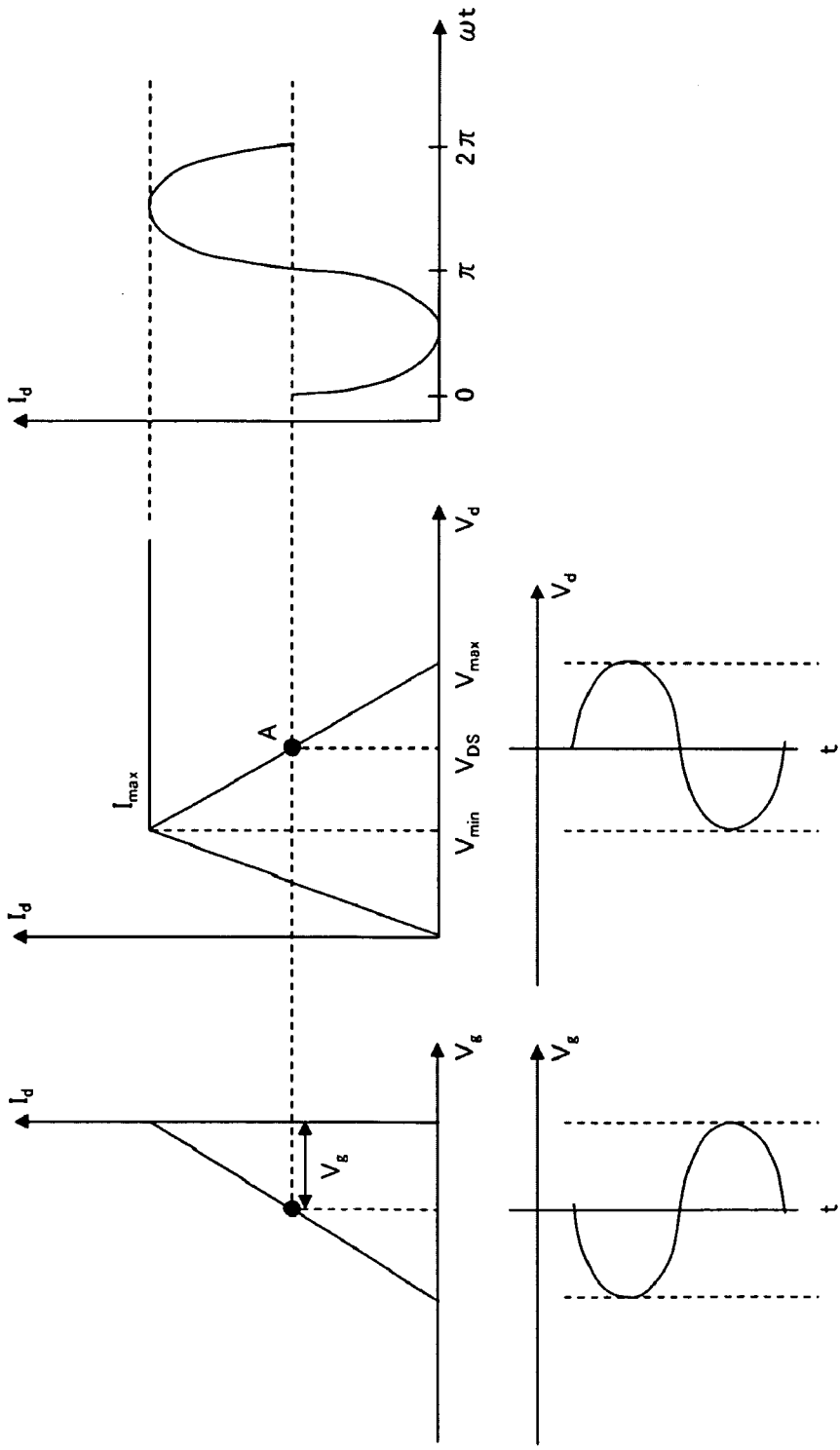
FIG. 4 is an explanatory view of the A class operation of the power amplifier.

FIG. 4 is an explanatory view of the A class operation of the power amplifier 16. Among them, the upper row indicates, in order from the left, the relationship between the drain current and the gate voltage, the relationship between the drain current an the drain voltage, and the conduction angle of the drain current. The lower row shown in FIG. 4 indicates the changes with time of the gate voltage and the drain voltage shown by the upper row.

The gate voltage value Vg when the power amplifier 16 performs the A class operation is set such that the drain current can take the form of the sine waves of the maximum value "Imax", and the minimum value "0" as shown at the center of the upper row in FIG. 4. At this time, as shown at the upper row on the right shown in FIG. 4, the conduction angle of the drain current is 360° (2π) of the drain current. That is, a current constantly passes through the power amplifier 16, and all input transmission signals are amplified.

Figure 5:
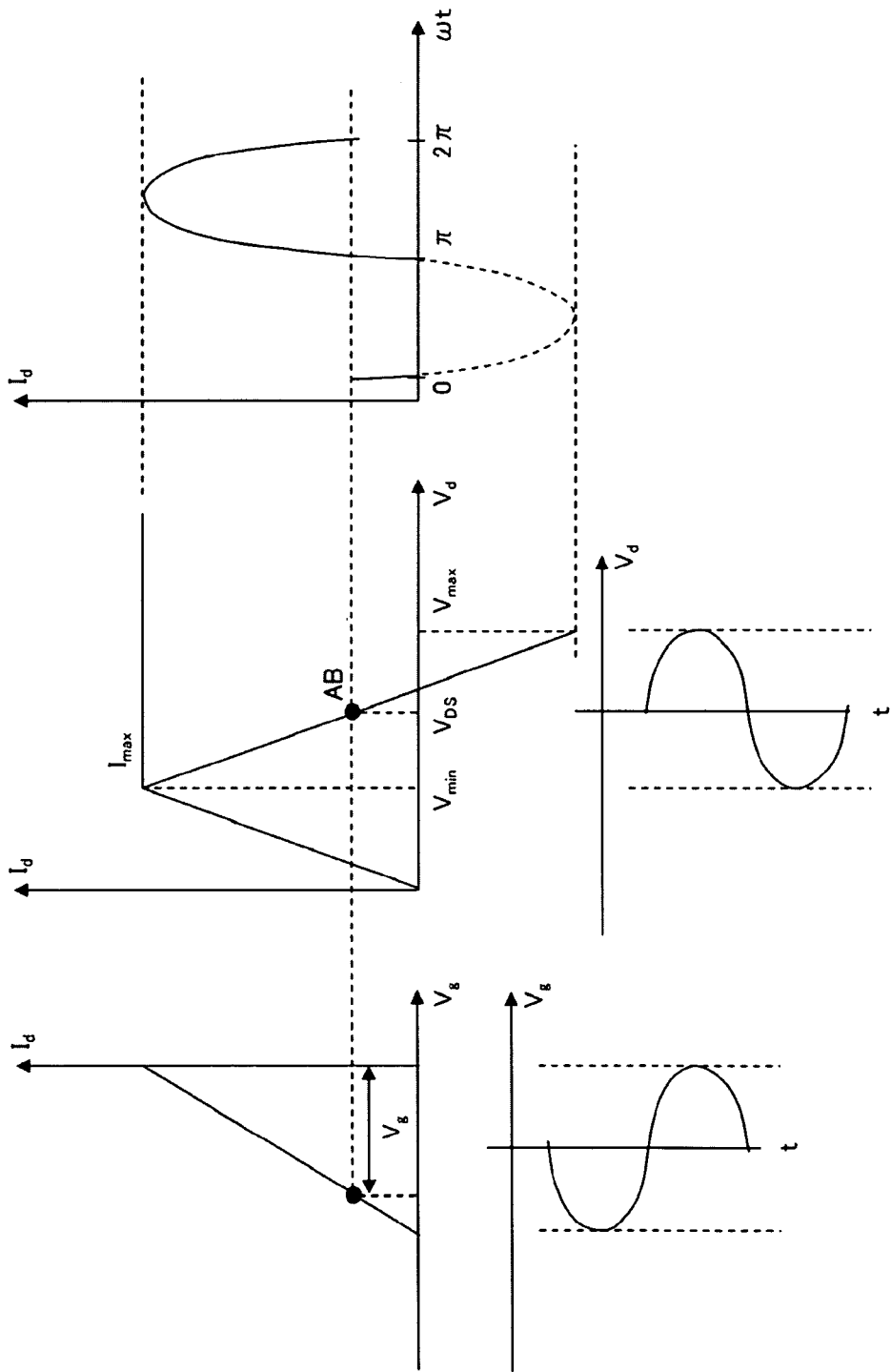
FIG. 5 is an explanatory view of the AB class operation of the power amplifier.

FIG. 5 is an explanatory view of the AB class operation of the power amplifier 16. As also shown in FIG. 4, the upper row indicates, in order from left, the relationship between the drain current and the gate voltage, the relationship between the drain current and the drain voltage, and the conduction angle of the drain current. The lower row in FIG. 5 indicates the changes with time of the gate voltage and the drain voltage shown in the upper row.

With regard to the power amplifier 16 that performs the above-mentioned A class operation, the state in which the conduction angle is less than 360° (2π) is the AB class operation obtained by applying a heavy gate bias.

Figure 6A:
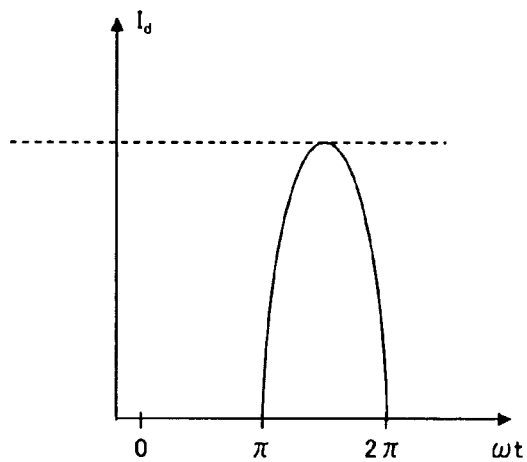
FIG. 6A is an explanatory view of the B class operation of the power amplifier.
Figure 6B:
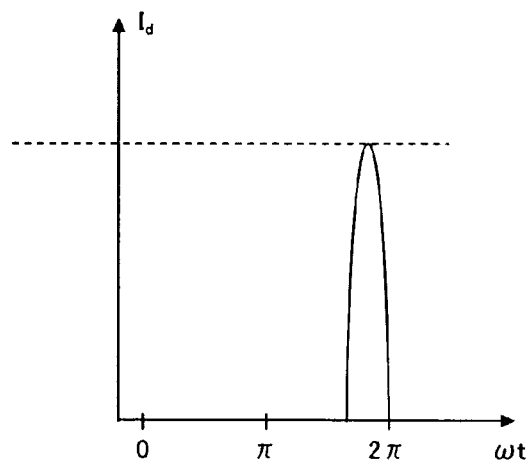
FIG. 6B is an explanatory view of the C class operation of the power amplifier.

FIGS. 6A and 6B respectively show examples of waveforms of the drain currents of the power amplifier 16 performing the B class operation and the C class operation. The B class operation shown in FIG. 6A is the state in which the conduction angle is 180° (π) after further changing the gate bias with respect to the power amplifier 16 performing the AB class operation shown in FIG. 5. FIG. 6B shows the C class operation indicating the state in which the conduction angle is less than 180°.

As shown in FIG. 6B, a current does not pass through the power amplifier 16 that performs the C class operation at almost any portion of the circulation angle. That is, by setting the gate voltage $V_{GC}$ such that the C class operation can be performed, the power amplifier 16 can be quickly switched off.

As described above, the wireless transmitter/receiver 1 according to the present embodiment switches off the drain power supply of the power amplifier 16 of the transmission unit 2 during reception in the TDD system, and sets the gate voltage to the gate voltage $V_{GC}$ of the C class operation. By setting during reception a value higher than the gate voltage value $V_{GA}$ of the A class operation during transmission, the power amplifier 16 is quickly turned off when the antenna 11 is switched from the transmission unit 2 to the reception unit 3, thereby preventing the drain current by the transient response from leaking to the reception unit 3. By preventing the drain current of the power amplifier 16 from leaking to the reception unit 3, the interference by the leak of current can be prevented, and the power efficiency can be improved.

As according to the above-mentioned embodiment, it is desired to set the gate voltage of the C class operation as the gate voltage during reception, but the present invention is not limited to this application. For example, a gate voltage of a D class operation can be set.

Figure 7:
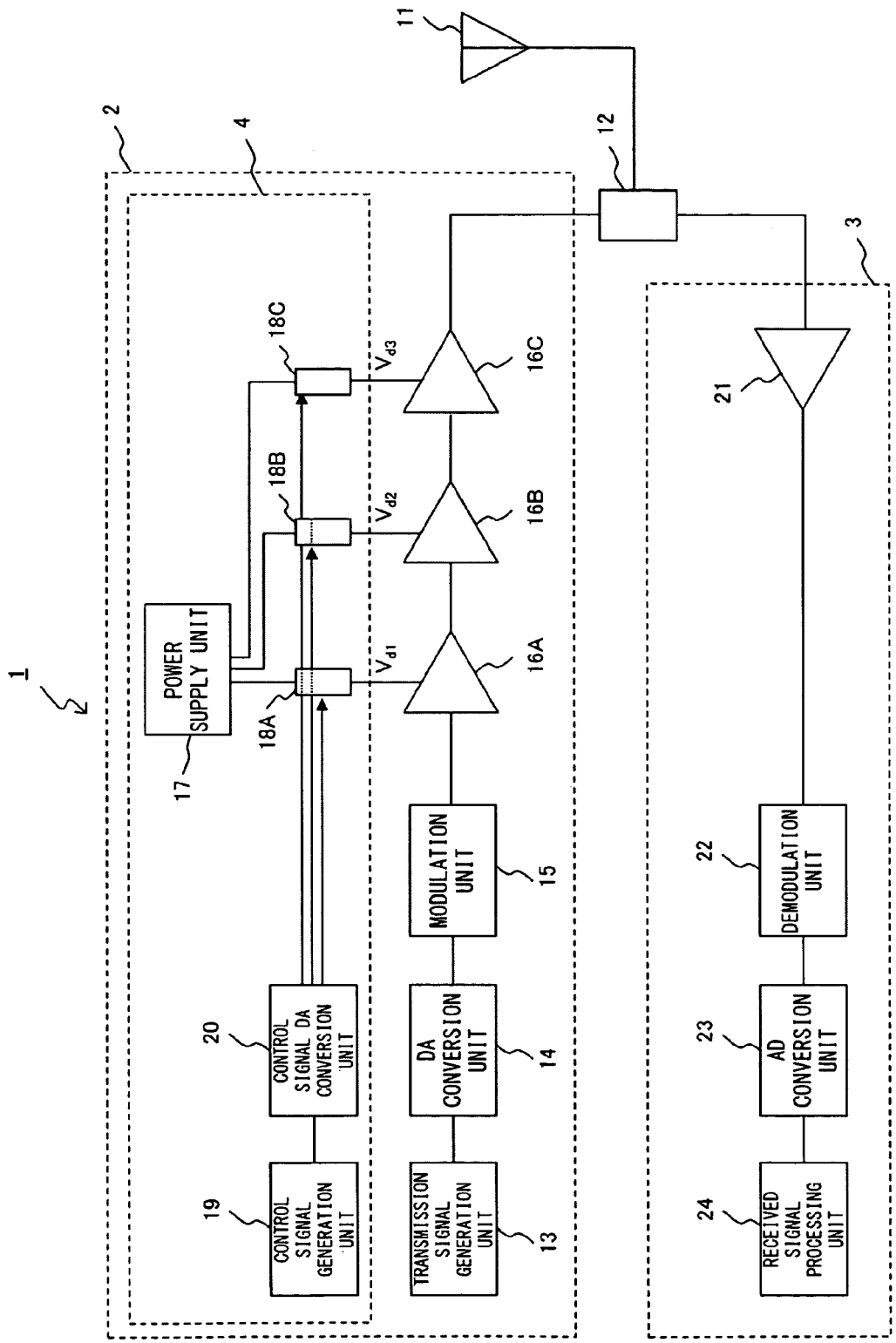
FIG. 7 shows the configuration of the wireless transmitter/receiver according to the second embodiment.

FIG. 7 shows the configuration of the wireless transmitter/receiver according to the second embodiment. The configuration is compared with the configuration of the wireless transmitter/receiver 1 according to the first embodiment described above, and different points are mainly described below.

The wireless transmitter/receiver 1 according to the present embodiment is provided with the multi-stage (3 stages in FIG. 7) power amplifier 16. The switch unit 18 is provided for each power amplifier 16 so as to switch on/off each power amplifier 16. In this embodiment, the power amplifiers 16 are assigned reference numerals 16A, 16B, and 16C in order from the power amplifier 16 closest to the transmission signal generation unit 13. The switch units 18 corresponding to the power amplifiers 16A, 16B, and 16C are assigned reference numerals switch units 18A, 18B, and 18C.

The control signal generation unit 19 generates a control signal for control each of the power amplifiers 16A, 16B, and 16C. Practically, it generates a control signal for switching on/off the drain power supply of each of the power amplifiers 16A, 16B, and 16C, and a control signal for setting different gate voltage values between transmission and reception.

The present embodiment is different from the above-mentioned embodiment in that the timing of turning on the drain power supply during transmission is set for each power amplifier. The embodiment is described below in detail with reference to FIG. 8.

Figure 8:
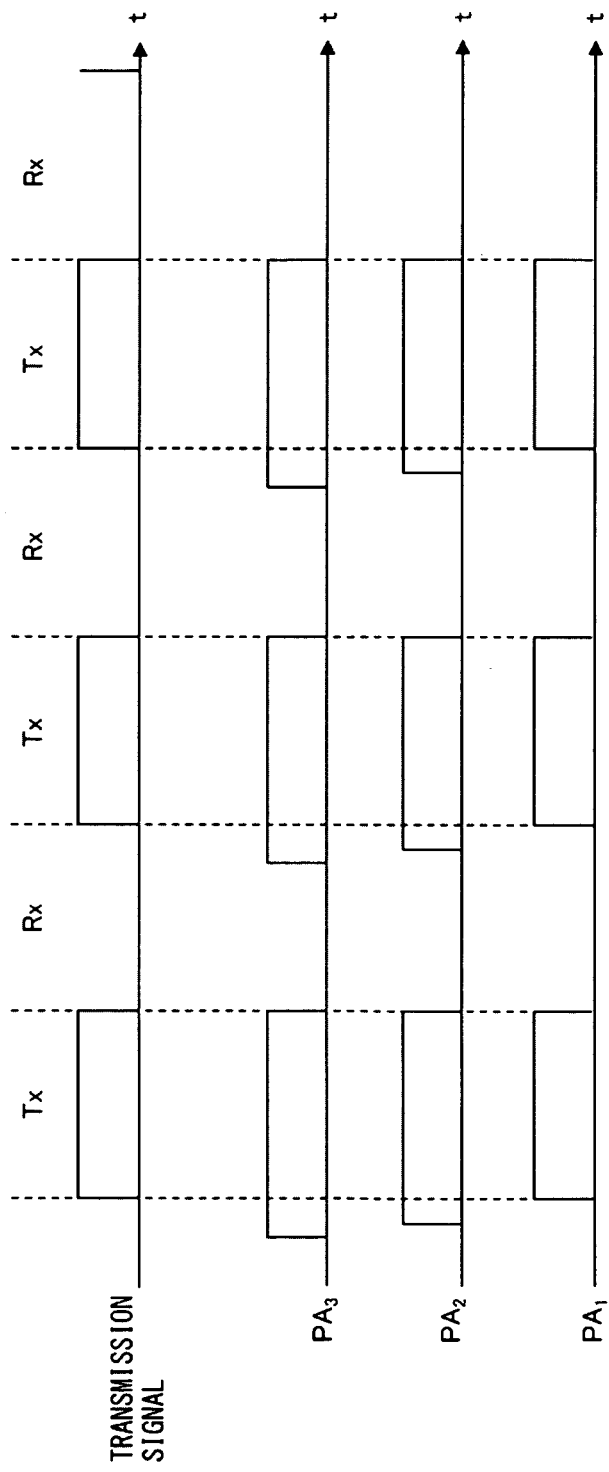
FIG. 8 shows the transmission/reception time chart and the relationship among the drain voltages of the power amplifier.

FIG. 8 shows the transmission/reception time chart and the relationship among the drain voltages of the power amplifiers 16A, 16B, and 16C. As also in FIG. 3, a time axis is set in the right direction, and a transmission time Tx and a reception time Rx are set.

In FIG. 8, in the three power amplifiers 16, the drain power supply is turned on sequentially from the power amplifier 16C closest to the antenna 11, and the drain power supply of the power amplifier 16A farthest from the antenna 11 is turned on with the start timing of the transmission time Tx, thereby sequentially switch the amplifiers.

Generally, in the transmission unit 2, the output power near the transmission antenna is the largest. Therefore, the capacity of the power amplifier 16 at the last stage, that is, the capacity of the power amplifier 16C, is the largest. That is, the amount of drain current of the power amplifier 16C is larger than those of the power amplifiers 16A and 16B. Therefore, when the power amplifier 16C is switched on/off, there is a difference between the rising time and falling time.

However, according to the present embodiment, the timing of switching on the drain power supply of the multi-stage power amplifier 16 is shifted so that the power amplifiers 16C and 16B having relatively larger capacities, that is, the power amplifiers having late rising time, are switched on before the transmission/reception switch timing. The (drain power supply of the) power amplifier 16A farthest from the antenna 11 is switched on with the transmission/reception switch timing. By adjusting the rising timing of the power amplifiers 16C and 16B, the rising timing of each stage of the multi-stage power amplifier 16 can be matched with each other.

The power amplifiers 16B and 16C are switched on in the reception time Rx, but a transmission signal is not transmitted to the power amplifiers unless the power amplifier 16A is switched on. Therefore, the influence on the reception unit 3 can be suppressed.

On the other hand, when the transmission time Tx is switched to the reception time Rx, the drain power supplies of all power amplifiers 16 are switched off. Since there is transient response remaining for the power amplifiers 16B and 16C having relatively large capacities, it is necessary to switch them off as soon as possible. However, if one power amplifier of the multi-stage power amplifier 16, for example, the power amplifier 16A in the example shown in FIG. 8, is switched off, then no high frequency signal is output. Therefore, the influence of the power amplifiers 16B and 16C on the reception unit 3 can be minimized.

From the viewpoint of power efficiency and minimizing the influence on the reception unit 3, it is desired that all power amplifiers 16 are switched off at the reception time Rx as shown in the example in FIG. 8. However, the method of switching on/off a drain power supply is not limited to the above-mentioned method.

If the power amplifier 16C closest to the antenna 11 is kept in the ON state in the reception time Rx, then a residual signal is amplified in the reception unit 3, thereby possibly causing an undesired influence. Therefore, the drain power supply of the power amplifier 16C is to be turned off with the transmission/reception switch timing. For example, the drain power supply of at least one of other power amplifiers 16A and 16B can be kept in the ON state of the drain power supply.

Thus, the combinations of the control of the drain power supplies of the power amplifiers 16A, 16B, and 16C are listed below.

(1) Turning on/off a drain power supply is controlled on all power amplifiers.

(2) The drain power supplies of the power amplifiers 16C and 16B are on/off controlled, and the drain power supply of the power amplifier 16A is constantly in the ON state.

(3) The drain power supplies of the power amplifiers 16C and 16A are on/off controlled, and the drain power supply of the power amplifier 16B is constantly in the ON state.

(4) The drain power supply of only the power amplifier 16C is on/off controlled, and the drain power supplies of the power amplifiers 16A and 16B are constantly in the ON state.

By switching on/off a part of the multi-stage power amplifier 16, the number of output from the control line and the DA conversion unit 14 can be reduced, thereby simplifying the configuration of the power amplifier control unit 4.

FIG. 8 shows only the transmission/reception time chart and a drain voltage, but does not show a gate voltage. However, as with the method of controlling the power amplifier according to the first embodiment described above, the power amplifier 16 whose drain power supply is switched on/off can be configured to be set to the gate voltage value $V_{GA}$ of the A class operation during transmission, and to the gate voltage $V_{GC} (>V_{GA})$ of the C class operation during reception. When different gate voltages are set between transmission and reception, the configuration of equally setting the gate voltage value $V_{GA}$ and the gate voltage $V_{GC}$ for all power amplifiers 16 can be adopted, or the configuration of setting a different value for each power amplifier 16 can be adopted. In any configuration, the same effect can be obtained as in the method of controlling the power amplifier in the wireless transmitter/receiver according to the first embodiment described above.

In the description above, the power amplifier 16 using a field effect transistor is assumed. However, the present invention is not limited to this application. For example, a power amplifier using a bipolar transistor can obtain a similar effect by adopting the method of controlling the power amplifier according to the first and second embodiments.

As described above, the wireless transmitter/receiver 1 according to the above-mentioned embodiments is provided with the power amplifier control unit 4 for the transmission unit 2, and the power amplifier control unit 4 controls the gate voltage and the drain voltage of the power amplifier 16. By switching on/off the drain voltage with the transmission/reception switch timing, the power amplifier 16 is turned off during reception. Furthermore, the gate voltage is set to a different voltage value depending on the transmission/reception switch timing of the wireless transmitter/receiver 1. By setting the gate voltage value of the C class operation during reception, a current does not pass through almost any portion of the conduction angle, thereby quickly switching off the power amplifier 16. Thus, when a switching operation is performed between transmission and reception, a leak of current from the transmission unit 2 to the reception unit 3 can be suppressed. By suppressing the leak of current to the reception unit 3, the interference by the leak of current can be prevented and the power efficiency can be improved.

Furthermore, when the power amplifier 16 can be switched on/off with the transmission/reception switch timing, the transmission/reception switch unit 12 immediately below the antenna 11 can be free of a hot switch. That is, the transmission/reception switch unit 12 can be free of on/off switching operation while inputting a high frequency signal. The effect is specifically expected when RF-MEMS (radio frequency-micro electro mechanical systems) switch is used as the transmission/reception switch unit 12.

What is claimed is:

1. A wireless communication apparatus by a time division duplex system comprising: an antenna, a transmission unit generating a transmission signal to be transmitted through the antenna, a reception unit demodulating the signal received through the antenna, and a transmission/reception switch unit connecting the transmission unit to the antenna during reception and connecting the reception unit to the antenna during reception, wherein:

the transmission unit comprises:

a transmission signal generation unit generating the transmission signal;

a power amplifying unit amplifying the transmission signal generated by the transmission signal generation unit;

a control signal generation unit generating a drain voltage control signal for control of a drain voltage of the power amplifying unit and a gate voltage control signal for control of a gate voltage of the power amplifying unit; and a switch unit switching off a drain power supply of the power amplifying unit during reception in a time division duplex system;

the power amplifying unit sets a higher gate voltage during reception in the time division duplex system than during transmission.

2. The apparatus according to claim 1, wherein
during reception in the time division duplex system, a gate voltage at which the power amplifying unit performs a C class operation is set.

3. A wireless communication apparatus by a time division duplex system, comprising: an antenna, a transmission unit generating a transmission signal to be transmitted through the antenna, a reception unit demodulating the signal received through the antenna, and a transmission/reception switch unit connecting the transmission unit to the antenna during reception and connecting the reception unit to the antenna during reception, wherein the transmission unit comprises:
a transmission signal generation unit generating the transmission signal;
a multi-stage power amplifying unit amplifying the transmission signal generated by the transmission signal generation unit;
a control signal generation unit generating a drain voltage control signal for control of a drain voltage for each power amplifying unit; and
a switch unit switching off a drain power supply of the power amplifying unit during reception in a time division duplex system for at least a power amplifying unit provided at a closest position from the antenna in the multi-stage power amplifying unit; and
the power amplifying unit whose drain power supply is switched off during reception in the time division duplex system is switched on when a drain power supply of a power amplifying unit farthest from the antenna is switched from reception to transmission in the time division duplex system by sequentially switching on the drain power supply from a power amplifying unit closer to the antenna.

4. The apparatus according to claim 3, wherein
the control signal generation unit further generates a gate voltage control signal for control of a gate voltage of the power amplifying unit; and
the power amplifying unit sets a higher gate voltage during reception in the time division duplex system than during transmission.

5. A power amplifier control method for controlling a power amplifier, comprising:
generating a drain voltage control signal for control of a drain voltage of the power amplifier and a gate voltage control signal for control of a gate voltage of the power amplifier; and
switching off the drain power supply of the power amplifier during reception in a time division duplex system according to the drain voltage control signal, and setting a higher gate voltage during reception in the time division duplex system than during transmission according to the gate voltage control signal.

6. A power amplifier control apparatus for controlling a power amplifier, comprising:
a control signal generation unit generating a drain voltage control signal for control of a drain voltage of the power amplifier and a gate voltage control signal for control of a gate voltage of the power amplifier; and
a switch unit switching off the drain power supply of the power amplifier during reception in a time division duplex system according to the drain voltage control signal, wherein
in the power amplifier, a higher gate voltage is set during reception in the time division duplex system than during transmission according to the gate voltage control signal.

* * * * *